March 18, 1952     C. A. KRENS     2,589,823
BAKED CONFECTION AND MOLD FOR SAME
Filed Feb. 1, 1950
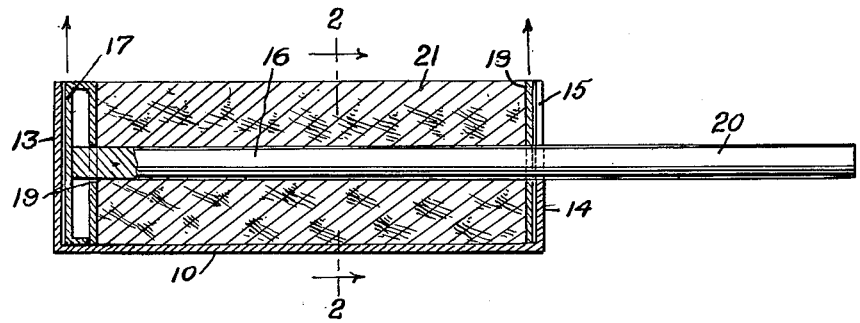
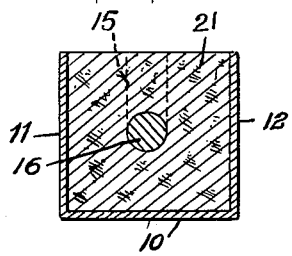
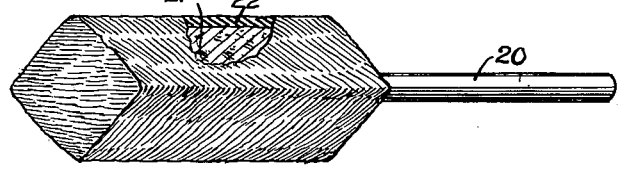
INVENTOR.
Charles A. Krens
BY
Munn, Liddy & Glaccum
Attorneys Patented Mar. 18, 1952

2,589,823

UNITED STATES PATENT OFFICE 2,589,823

BAKED CONFECTION AND MOLD FOR SAME

Charles A. Krens, Staten Island, N. Y.

Application February 1, 1950, Serial No. 141,652

3 Claims. (Cl. 99—439)

This invention relates to a new and useful improvement in a baked confection and a mold for making the same.

The object of the invention is to provide a simple, efficient, durable, economical mold which can be used to bake a confection, such as cake dough into the form of a small cake with a support or stick disposed thereinto, whereby the support or stick may be used as a handle. To this end, the mold is provided with means to receive the handle and support it in the mold in the proper position and relation with respect to the interior of the mold, so that it will be effective as a support when the confection is removed from the mold.

The invention further concerns the baked confection itself, which is in the form of a small cake, with a handle projecting therein and extending therefrom and being of a nature to receive one or more edible coatings if desired.

The present preferred form which the invention may assume is illustrated in the drawings, of which:

Fig. 1 is a longitudinal cross section through the mold showing a baked confection therein;

Fig. 2 is a vertical cross section taken on the line 2—2 of Fig. 1; and,

Fig. 3 is a perspective view partly broken away, showing the confection removed from the mold provided with an edible coating.

Referring now merely to the specific form of the invention, it will be seen that there is provided in the manufacturing of this baked confection, a mold pan 10 having side walls 11 and 12 and end walls 13 and 14, and open at the top in the usual form of such pan or mold. However, in this case, an end wall such as 14 has a slot 15 cut therein and extending downwardly from the top. This slot is to receive a supporting element 16 which projects into the mold as shown. At the inner end of the support 16 closely adjacent the end wall 13 of the mold, there is disposed a flange element 17 made of a piece of cardboard, heavy paper, or similar material, bent over on itself to form spaced walls, the inner one of which is provided with an aperture 19 through which the end of the support or stick 16 extends. Another flange 18 in the form of a simple apertured disk, is disposed around the support 16 closely adjacent the other end of the mold and adjacent the slot 15. This support 16 may be a solid rod or may be tubular although it is shown as a solid rod and its one end projects outwardly through the slot 15 outside the mold to form a handle 20. The material 21 to be baked is poured into the mold with the stick 16 therein, and will naturally fill the mold and flow around the stick. The mold is then placed in an oven and the contents baked. When the baking process is over, it is a simple matter to lift the contents out by means of the handle 20 and remove the flanges 17 and 18 thereby presenting a baked confection with a stick imbedded therein to act as a handle. This baked confection may be eaten as is, or may be covered with a suitable coating 22 by dipping or other well known processes, which may be composed of ice cream, or chocolate, or other edible coating.

This article makes a very simple and attractive baked confection, which can be eaten as such or may be otherwise treated in the manner described, to add suitable sweet or edible coatings thereto.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

1. A mold for baked confections which comprises a mold pan having bottom, end, and side walls, one end wall having a slot extending down from the top edge, a supporting stick disposed longitudinally within the mold pan and received in said slot, said stick to be disposed in this position through the baking of a confection and acting as a supporting handle for the baked product, a flange adjacent each side wall, each flange having an aperture therethrough, said stick being received in the apertures to prevent upward movement of said stick during the baking operation.

2. A mold for baked confections which comprises a mold pan having bottom, end, and side walls, one end wall having a slot therein extending downwardly from the top edge thereof, a stick extending through said slot and projecting longitudinally into the mold pan, a pair of flange elements disposed in the mold pan closely adjacent the end walls, one of said flanges surrounding the stick adjacent the slot, the other of said flanges being in the form of a blank bent to form spaced paralleled walls, one of said walls having an aperture therein into which the end of the stick projects, both of said flanges adapted to prevent upward movement of the stick during the baking operation.

3. A mold for baked confections which comprises a mold pan having bottom, end, and side walls, one end wall having a slot extending down from the top edge thereof, a supporting element received in said slot and extending longitudinally into the pan, a flange element disposed in the pan adjacent the end wall and made of material bent to form spaced paralleled walls, the wall of the flange further from the end wall of the mold having an aperture into which the end of the supporting element projects, and another flange element bored to surround the supporting element adjacent the other end wall and the slot, both of said flange elements adapted to prevent upward movement of the supporting element during the baking operation.

CHARLES A. KRENS.

REFERENCES CITED

The following references are of record in the file of this patent:

UNITED STATES PATENTS

| Number | Name | Date |
| --- | --- | --- |
| 969,133 | Cooper | Aug. 30, 1910 |
| 1,296,158 | Bonham | Mar. 4, 1919 |
| 1,312,325 | Hinck | Aug. 5, 1919 |
| 1,639,122 | Whitman | Aug. 16, 1927 |
| 1,646,921 | Loose | Oct. 25, 1927 |
| 1,684,579 | Ferguson et al. | Sept. 18, 1928 |
| 1,696,343 | Burdick | Dec. 25, 1928 |
| 1,946,495 | Jones | Feb. 13, 1934 |
| 1,979,429 | Wilkes et al. | Nov. 6, 1934 |
| 2,009,602 | Bauer | July 30, 1935 |
| 2,212,765 | York | Aug. 27, 1940 |
| 2,252,990 | Smith | Aug. 19, 1941 |
| 2,312,046 | Neilson | Feb. 23, 1943 |
| 2,412,756 | Smith | Dec. 17, 1946 |